UNITED STATES PATENT OFFICE.

CHRISTIAN SEEBACH, OF NEW YORK, N. Y.

IMPROVEMENT IN PROCESSES OF POLISHING WOOD.

Specification forming part of Letters Patent No. 136,010, dated February 18, 1873.

*To all whom it may concern:*

Be it known that I, CHRISTIAN SEEBACH, of the city, county, and State of New York, have invented a new and Improved Process of Polishing Wood, of which the following is a specification:

This invention relates to a new process of closing the pores of wood preparatory to the polishing of its surfaces. At present fine polishes are produced on piano-fortes and other articles by many successive primary applications of shellac, each of which is "rubbed down" or scraped until the pores of the wood are entirely closed. Not until then is it proper to impart the actual polish by means of varnish or otherwise. Thus the polishing process is expensive chiefly on account of the difficulty of closing the pores of the wood. My invention has for its object to overcome this difficulty by the use of a composition by which the pores of the wood will be rapidly and efficiently closed.

For the first coat I use paint mixed with plaster of Paris. The paint, which may be sienna, umber, or other, should be ground in oil, and then mixed with plaster of Paris in the proportion of about one and a half part of paint to four parts of gypsum. These ingredients are next mixed with spirits of turpentine to the requisite consistency, and the mixture is applied by a brush or other means to the surface to be polished. After application the coating is rubbed down with a rag, shavings, or other yielding matter, and then allowed to dry. The wood is now ready for an application of one coat of shellac, which is rubbed down in the usual manner to be finally covered with the polishing varnish or substance.

Having thus described my invention, I claim as new and desire to secure by Letters Patent—

The application to wood surfaces, which are to be polished with shellac and varnish, of a preliminary coating formed of plaster, paint, and turpentine, prepared and applied as described.

CHRISTIAN SEEBACH.

Witnesses:
A. V. BRIESEN,
T. B. MOSHER.